United States Patent Office 3,145,196
Patented Aug. 18, 1964

3,145,196
PROCESS AND CATALYST FOR THE POLYMERIZATION OF OLEFINS
Willem F. Engel, Amsterdam, Netherlands, assignor to Shell Oil Company, a corporation of Delaware
No Drawing. Filed Sept. 17, 1959, Ser. No. 840,531
Claims priority, application Netherlands Sept. 22, 1958
2 Claims. (Cl. 260—94.9)

The present invention relates to a process for the polymerization of olefins and to a catalyst utilized in such process. More particularly, this invention relates to the polymerization of olefins and to normally solid polymer using an improved catalyst comprising oxides of chromium, silicon and aluminum.

It is known that 1-olefins having from 2 to 8 carbon atoms may be polymerized at a temperature of less than 260° C. to provide an improved polymer with a catalyst comprising catalytically active components such as oxides of chromium supported on a carrier of silica and alumina. Such a process is discussed at length in U.S. Patent 2,825,721 of J. P. Hogan and R. L. Banks. As indicated in this patent, it is known that improved results have been obtained when the catalyst material has been subjected to special treatments, and, prior to the present invention, it was believed desirable to treat the catalyst carrier with acids such as acid fluoride prior to the addition of the catalytically active component to the carrier. Carrier materials heretofore used for making such catalysts are already acid even without treatment of acid fluoride materials. In other words, when the carrier material is contacted with water, the water gives an acid reaction.

It has now been found, quite unexpectedly, that an improved catalyst capable of giving an improved polymerization process is obtained by treating the carrier material with an alkali and heating prior to the addition of the catalytically active components. The alkali treatment should be sufficient to provide a neutral or slightly alkaline catalyst.

It is an object of this invention to provide such a catalyst whereby an improved process for the polymerization of 1-olefins is obtained which gives increased yields of polymer for a given amount of catalytically active material.

These and other objects are accomplished by a process for the preparation of catalysts suitable for polymerizing olefins, which comprises treating a carrier containing alumina and silica in a weight ratio in the range of from 15:85 to 40:60 with a quantity of an alkali, said alkali being selected from the class consisting of metal oxides, metal hydroxides, metal alcoholates, and a volatile acid salt, and being utilized in a quantity of from 1/5 to 5 times the quantity required to increase the pH of the carrier to 7 measured with the carrier at a concentration of 1 gram of said carrier for 75 milliliters of water, heating the combined alkali and carrier to a temperature in the range from 200° C. to 800° C., and thereafter adding a catalytically active component selected from the class consisting of oxide of chromium, oxide of vanadium, and oxide of molybdenum to said carrier.

The olefins which are applicable to this invention should have a terminal double bond, i.e., be a 1-olefin. Preferably the olefin contains a small number of carbon atoms such as 2 to 5, but olefins having a larger number of carbon atoms such as say 8 carbons are believed to be polymerizable by the process of the present invention. Thus ethylene is the preferred olefin, and propylene is the next preferred olefin. Other suitable olefins include butylene-1, amylene-1, isoamylene-1, hexylene-1, octylene-1, etc. Copolymers may be prepared from mixtures of these olefins, particularly those containing at least 1% of an olefin in admixture with one or more other olefins, e.g., an ethylene-propylene mixture.

The carrier material utilized for preparing the catalyst of this invention contains alumina and silica in a weight ratio in the range of from 15:85 to 40:60 and preferably in the range of from 20:80 to 35:65.

The oxides of aluminum and silicon are preferably mixed with each other and are most preferably in the form of a gel. A mixed gel may be obtained by precipitating the two oxides together from solutions of soluble aluminum and silicon compounds. Mixed gels may also be prepared by precipitating a gel of one or two oxides on a previously prepared gel of the other oxides. Other materials comprising alumina and silica and which are suitable as a carrier for the preparation of the catalyst include aluminum silicates, such as certain compositions available as commercial cracking catalysts. There are often natural silicates activated by a sulfuric acid treatment. If necessary, the ratio of alumina to silica may be increased by impregnating the silicate with a solution of a compound, such as aluminum nitrate, which on heating is converted into alumina.

Before impregnating the carrier, it is advisable to treat it for some time (generally some hours) at elevated temperatures (for example, 500° C. to 750° C.) with air or other gas containing oxygen. Preferably, there is also 3 to 10% by volume of water vapor, based on the gaseous mixture. In some cases an inert gas may be used instead of gas containing oxygen. This treatment may very suitably be carried out in a fluid bed. The carrier material should, of course, be porous. The active surface area is generally at least 100 sq. m./gram and preferably at least 300 sq. m./gram.

The greatest improvement is obtained when the catalyst is produced with the use of carrier material which gives a more or less neutral reaction in water, the pH in this water being 6.5 to 8 when 1 gram of carrier material is shaken with 75 ml. of very pure water at 20° C. This effect may be obtained by reacting an acid carrier with a quantity of alkali compound approximately required for completely neutralizing the acid reaction. Improvements are also obtained, however, with smaller quantities of alkaline compound as well as with a not undue excess.

The invention thus relates to the production of such catalyst carriers which consist essentially of the oxides of silicon and aluminum and in which the silica and alumina are, at least partly, chemically bound, which carrier is reacted with an alkali compound and is then heated to a temperature in the range of 200° C. to 800° C. The alkali compound may be a metal oxide, a hydroxide, an alcoholate or a salt of an acid which is volatile at the heating temperature. The quantity of alkali compound, expressed in equivalents per gram of the said material, is within the range of from about 1/5 to 5 times the quantity of alkali required to increase the pH of 75 ml. of very pure water shaken with 1 gram of the said material to 7 at 20° C. The alkali compound is preferably used in a quantity such that the amount expressed in equivalents per gram of the carrier material or equivalent weight per unit weight is from .8 to 1.3 times the quantity of alkali required to increase the pH of 75 ml. of very pure water shaken with 1 gram of the carrier material to 7 at 20° C. It should be understood that the very pure water not only has a pH of 7 but it is ion free and carbon dioxide free.

Preferably the alkali compound is a compound of the class mentioned above in which the metal is an alkali metal or an alkaline earth metal, and the alkali metals are preferred. Also preferred are the oxide, hydroxide, and carbonates or other materials which will convert to a metal oxide on heating to above 200° C. and which do not leave a carbon residue. As mentioned above, the amount of alkaline material should be sufficient to provide a substantially neutral carrier, but excessive amounts should be avoided. The actual amount of material used will vary depending upon the acidity of the carrier being treated, but a typical alumina-silica carrier which contains an alumina-silica weight ratio of 25 to 75 requires .43 ml. equivalent of alkali hydroxide per gram of carrier. Accordingly, if lithium hydroxide were used, the amount of lithium added to the alumina-silica carrier would be about 0.3% by weight, and, if potassium hydroxide were used, it would be about 1.7% by weight of potassium in order to produce a neutral carrier. Accordingly, a weight range of alkali or alkaline earth metals usable in the present invention might vary from, say, 0.06% to 8.5% by weight, and would more likely be from about 0.2% to 5% by weight.

To insure a uniform distribution of the alkali compound it is advisable to impregnate the carrier material with a solution of the alkali compound, after which the material is dried and heated.

As stated above, the material is heated at temperatures in the range of 200 to 800° C., preferably 400 to 600° C. In general, the higher the temperature the shorter may be the duration of heating. A period of half an hour to a few hours is usually sufficient.

As mentioned above, the treated carrier is impregnated with a catalytically active component. It should also be mentioned that it is important to complete the alkaline treatment of the carrier by heating prior to the addition of the catalytically active component in order to achieve the improved results obtainable by the present invention. Examples of suitable catalytically active components are chromium, molybdenum and vanadium in the form of oxides. It should be noted, however, that compounds of these oxides with the silica and/or the alumina of the carrier are likely to be formed when the catalysts are prepared. The said metals are preferably, at least partly, present in a valency lower than the highest valency of the relative metal. They may be supported on the carrier in the form of compounds in which they are in the highest valency state, from which they are afterwards reduced. Oxides of chromium are preferred. When chromium oxide is used, it is preferably reduced by treating the carrier impregnated with a hexavalent chromium oxide at temperatures not exceeding 180° C. with the saturated aliphatic hydrocarbon or a saturated cycloaliphatic hydrocarbon or an aliphatic aromatic hydrocarbon not containing unsaturated bonds in the aliphatic portion.

The hydrocarbon may be liquid or gaseous during the reduction treatment. Very good results are obtained with liquid iso-octane (2,2,4-trimethyl pentane), in which the material to be reduced may be suspended. Propane, butane, pentane, hexane, heptane, decane, cyclohexane, toluene, and the xylenes may also be used. Use is preferably made of hydrocarbons which may afterwards serve as solvent for the polymer which is to be produced. The temperature of this reduction treatment is preferably in the range of from 40 to 100° C. It is advisable to start this treatment at a relatively low temperature, for example below 50° C., and to increase the temperature gradually. Compounds of hexavalent molybdenum and pentavalent vanadium are reduced by means of hydrogen, carbon monoxide or hydrocarbons at temperature of at least 300° C., generally not exceeding 650° C. and mostly in the range of from 400° C. to 550° C. If desired, use may also be made of reduction agents which are suitable for the purpose at lower temperatures, for example from 20 to 200° C. Examples are alkali metals, alkaline earth metals, boron alkyls, metal alkyls, boron hydrides, metal hydrides and alkaline earth carbides.

A preferred method by which the catalytic components are applied to carriers is impregnating the latter with solutions of soluble compounds of the catalytic components. In the case of chromium, chromic acid is suitable.

Generally speaking, suitable compounds are those which are converted into the oxide of the catalytically active metal when heated, for example, various nitrates, ammonium chromate or ammonium bichromate, ammonium molybdate and ammonium vanadate. The catalyst mass is dried after impregnating and then heated for some time, generally for several hours, to a temperature of at least 300° C., for example 500° C., in dry air or a dry inert gas.

The catalysts comprising chromium, molybdenum and vanadium furnish the highly desirable, solid polymers of the olefins. The weight ratio of the catalytically active metal to the total catalyst has also a great effect on the properties of the polymer. In general, suitable concentrations are in the range of from 0.1% and 5% by weight, calculated as metal on the total catalyst. When ethylene is polymerized with chromium, 2% to 3% by weight of chromium is generally used in the catalyst, when polymerization takes place above the softening point of the polymer, but when the polymerization temperature is below the softening point of the polymer and a polymer having an intrinsic viscosity of from 2 to 3 is desired, it is advisable to use a concentration of from 0.1% to 0.5% by weight of chromium in the catalyst.

Polymerization is preferably carried out in the presence of a liquid phase, which may consist of olefins or else of an inert solvent or diluent, in which the olefins and possibly the polymer are completely or partly dissolved. Suitable solvents are hydrocarbons, and particularly aliphatic hydrocarbons such as pentane, hexane, heptane, iso-octane and decane and cycloaliphatic hydrocarbons such as cyclohexane. In some cases, aromatics such as benzene, toluene and the xylenes, chlorinated hydrocarbons and other organic liquids may also be used. The presence of a liquid phase has several advantages, one of the most important being that the polymer which is dissolved and/or suspended in this phase can be readily removed from the catalyst.

If desired, the olefin may be allowed to flow in the liquid phase over a fixed catalyst bed. Generally, a suspension of the catalyst in the liquid reaction medium will be used, however, and the polymerization will be carried out in a stirred reactor, in which case the process may be carried out either batchwise or continuously. A suspension of catalyst in a liquid solvent may also flow through a reaction space in a gaseous olefin atmosphere, while distribution of the suspension insures a good contact thereof with the gaseous phase. In this case, the olefin may flow in countercurrent to the suspension of the olefin or solvent and suspended catalyst may be passed through the reaction space in parallel flow. The concentration of the catalyst, based on the liquid portion of the reaction mixture, may vary within wide limits. Concentrations of some tenths percent by weight as well as of 10% by weight are suitable, dependent on the operating conditions. Concentrations below 1% by weight are generally used. This generally applies to the concentration of the composition from which the catalyst is prepared by a reduction treatment during this preparation in the hydrocarbon used as reduction agent.

It is advisable to contact the olefin with the catalyst, at first under conditions under which there is little or no polymerization, after which the polymerization is initiated while heat is supplied. In the case of ethylene, conditions under which there is little or no polymerization prevail at temperatures below 60° C.–70° C. in combination with partial pressures less than 10 to 15 atm. abs. Still lower temperatures and partial pressures should be used to bring propylene under conditions under which there is little or no polymerization.

In the polymerization of ethylene according to the invention, suitable values to which the temperature may be allowed to rise are in the range of from 90° C. to 140° C. Suitable final values to which the partial pressure of the ethylene is allowed to increase are normally in the range of from 10 to 50 kg./sq. cm. When ethylene is polymerized at temperatures below the softening point of the polymer (about 115° C.) and a polymer is desired which has an intrinsic viscosity of from 2 to 3, a catalyst with a low chromium content (0.1% to 0.5% by weight of chromium) may be used with ethylene pressures in the range of from 10 to 20 kg./sq. cm.

In addition to the catalyst, a material which contains aluminum and silicon but is entirely or substantially free from catalytically active components, such as the silica-alumina carrier described above, may be added to the reaction mixture. This addition may highly increase the polymer production per gram of catalytically active component obtained per hour and also the total polymer production per gram of catalytically active component. Furthermore, addition of this material allows the catalyst concentration in the reaction mixture to be considerably decreased, while maintaining the total polymer yield.

The ratio of catalyst to the material which contains the oxides of aluminum or silicon but is free or substantially free from catalytic components affects the molecular weight and the intrinsic viscosity of the polymer produced. By suitably adjusting this ratio and, if desired, also the partial pressure under which the olefin is present, the molecular weight and the intrinsic viscosity may thus be controlled to certain requirements.

The invention is illustrated in more detail by the following examples:

EXAMPLE I

*Preparation of the Carriers*

The starting material was a commercial cracking catalyst consisting of alumina and silica and having the following properties:

Weight ratio ($Al_2O_3:SiO_2$) _____ 25:75
Particle size _____microns__ 20–120
Pore volume _____ml./gram__ 1.0
Surface area _____sq. m./gram__ 716

A quantilty of 65 grams of this product was heated for 10 hours at 650° C., while a mixture of 95% by volume of air and 5% by volume of water vapor was passed through the catalyst at a velocity of 30 liters per hour.

The mixture was subsequently cooled and two grams of the material were introduced into 150 ml. of vary pure water and stirred therewith. The pH of the water gradually decreased over a period of nine minutes and finally reached a value of about 3. A 0.05 N lithium hydroxide solution was then added to the water, after which 17.2 ml. (=0.43 m. eq. per gram of solid substance) were necessary to raise the pH to 7 (at 20° C.).

To 15 grams of the material treated with air and water vapor were added 27.5 ml. of an aqueous lithium hydroxide solution which, calculated on this volume, contained $15 \times 0.43 = 6.45$ m. eq. of LiOH (155 mg.). This quantity of solution was that which could just be absorbed by the said material without leaving unabsorbed liquid phase.

After impregnation of the carrier, it was dried, first for 30 minutes on a steam bath while stirring, and subsequently for one hour in air at 120° C. The dried carrier was then heated for five hours at 500° C. in a current of 30 liters per hour of dry air and finally cooled. This carrier, hereafter designated Carrier A, was then ready for use.

Another portion of 15 grams of the starting material treated with air and water vapor was processed by a procedure similar to that described above except that the LiOH was substituted by 6.45 m. eq. of KOH. This material is hereafter designated as Carrier B. A third portion of 15 grams of the material treated with air and water vapor was not impregnated with an alkali compound. It is hereafter identified as Carrier C.

*Preparation of the Catalysts*

27 ml. of an aqueous chromic acid solution, which contained 0.08 gram of $CrO_3$, were added to each of the Carriers A, B, and C (15 grams each). This volume of solution was that which could just be absorbed by the carrier without leaving unabsorbed liquid phase.

The impregnated carriers were then dried, first for 30 minutes on a steam bath while stirring and subsequently for one hour in air at 120° C., after which they were heated in a glass tube in a current of 30 liters per hour of carefully dried air for five hours at 500° C. In this manner, the catalysts A, B, and C were obtained from the Carriers A, B, and C, respectively.

For purposes of comparison, a catalyst D was prepared by impregnating 15 grams of the above mentioned cracking catalyst heated with air and water vapor as mentioned above with 27.5 ml. of a solution, which contained (calculated on this volume) 0.08 gram of $CrO_3$ and 0.155 gram of LiOH. After impregnation of the material, it was dried and heated, the procedure employed being similar to that described for the other catalysts.

Portions of 0.44, 0.44, 1.1 and 0.9 grams of the catalysts A, B, C, and D, respectively, were transferred to glass tubes and again heated for thirty minutes at 500° C., dry air being passed through. The tubes were then sealed by melting and only cooled afterwards so as to entirely prevent contact with moisture.

*Polymerization*

Comparative experiments were made in four carefully dried 300 ml. autoclaves. A tube containing catalyst was placed into each autoclave. The autoclaves were then closed and alternatively evacuated several times and flushed with pure, oxygen-free nitrogen. The tubes were broken by agitating the autoclaves, evacuated twice more and flushed with nitrogen. 100 ml. pure iso-octane (2,2,4-trimethyl pentane) were then introduced into each of the evacuated autoclaves.

The autoclaves were heated to 80° C. for twelve minutes, kept at this temperature for thirty minutes, and then cooled to 30° C. over a period of thirty minutes while continuing the agitation.

Dry, pure ethylene having an oxygen content less than 10 p.p.m. was introduced into the autoclaves at 30° C. at such a rate that the total excess pressure was 10 kg./sq. cm. Polymerization was initiated by gentle heating. The temperature was increased to 90° C. over a period of fifteen minutes, then to 105° C. over a period of ten minutes, and subsequently to 110° C. over a period of five minutes. The autoclaves were maintained at 110° C. for ten minutes and their contents then cooled to 105° C., which temperature was maintained. The pressure had meanwhile increased, although care was taken to insure that a superatmospheric pressure of 15 kg./sq.cm. was not exceeded. The pressure was kept constant at this value.

The experiments were completed three hours after the first contact of the ethylene with the catalysts. The autoclaves were cooled and opened. The conditions, insofar as they were dissimilar in the four experiments, as well as the results, are listed in the following table. The intrinsic viscosity (I.V.) was determined at 120° C. in decahydronaphthalene.

TABLE

| Catalyst | A | B | C | D |
|---|---|---|---|---|
| Alkali | Li | K | ------ | Li |
| Polymer yield in grams per gram of catalyst | 60 | 46 | 24 | 26 |
| In kg. per gram of chromium | 26 | 20 | 10 | 11 |
| I.V. | 2.8 | 3.0 | 2.7 | 1.7 |

The advantage of the catalysts produced according to the invention (A and B) is evident, both compared to the catalyst of which the carrier was not treated with alkali (C), and to the catalyst into which the alkali compound and the chromium compound were incorporated simultaneously (D).

EXAMPLE II

Two comparative experiments are carried out according to the procedures in Example I, using catalysts A and C, except that propylene is used in place of ethylene. The experiment having the carrier alkali treated shows improved polymer production over the experiment in which the carrier is not alkali treated.

EXAMPLE III

Two comparative experiments are carried out according to the procedures using catalysts A and C in Example I except that magnesium hydroxide is used in place of lithium hydroxide for treating Carrier A. Again, the treated carrier gives improved polymer production as compared to the untreated carrier.

EXAMPLE IV

A catalyst E was prepared, the procedure employed being similar to that described in Example I except that that the catalyst E differed from catalyst A in that it contained 2.5% by weight of vanadium (calculated as metal on the total catalyst) instead of chromium. In this case, the carrier was impregnated with an ammonium vanadate solution. 27.5 ml. of water, in which the required quantity of vanadate was dissolved, were used for impregnating 15 grams of carrier.

For the purpose of comparison, a second vanadium catalyst (F) was prepared by the procedure employed for catalyst C of Example I, the alkali treatment of the carrier metal being consequently omitted. In the present case, the treatment described in Example I of the catalysts with iso-octane (thirty minutes at 80° C.) prior to the polymerization was omitted. Instead, the vanadium-containing catalysts were treated in a dry nitrogen atmosphere with aluminum triethyl until the average vanadium valency had decreased to 3.8.

Polymerization experiments were then made with the catalysts E and F under comparable conditions. In each experiment 200 mg. of catalyst (E or F), together with 100 ml. of iso-octane, were introduced into a dry autoclave in the same way as in Example I. The temperature was increased to 150° C. Ethylene was introduced at such a rate that the pressure increased to 32 kg./sq.cm. in one hour. The said temperature and pressure were then maintained for a further two hours.

Catalyst E (0.3% of Li, 2.5% of V) yielded 105 grams of polymer per gram of catalyst but catalyst F (no Li, 2.5% V) only 70 grams of polymer per gram of catalyst.

EXAMPLE V

Two comparative experiments are carried out according to procedures in Example IV except that ammonium molybdate is used in place of ammonium vanadate for treating the carrier. The experiment using the treated carrier gives improved polymer production over the experiment using the untreated carrier.

I claim as my invention:

1. A process for the polymerization of hydrocarbon olefins having from 2 to 8 carbon atoms which comprises contacting the olefins with a catalyst prepared by treating a carrier consisting essentially of alumina and silica in weight ratio in the range of from 15:85 to 40:60 with an alkali selected from the group consisting of an alkali metal hydroxide and alkaline earth metal hydroxide, said alkali being utilized in a quantity of from 1/5 to 5 times the quantity required to increase the pH of the carrier to 7.0 measured with the carrier at a concentration of 1 gram of said carrier for 75 milliliters of water, heating the combined alkali and carrier to a temperature in the range of 200° C. to 800° C., and thereafter adding a catalytically active component selected from the class consisting of oxide of chromium, oxide of vanadium and oxide of molybdenum to said carrier, the metals of the respective oxides being at least partially present in a valency lower than their respective highest valences.

2. The process of claim 1 in which the olefin is ethylene.

References Cited in the file of this patent

UNITED STATES PATENTS

| | | |
|---|---|---|
| 2,785,141 | Fleck | Mar. 12, 1957 |
| 2,825,721 | Hogan et al. | Mar. 4, 1958 |
| 2,840,529 | Lefrancois | June 24, 1958 |
| 2,887,471 | Shearer et al. | May 19, 1959 |
| 2,912,419 | Peters et al. | Nov. 10, 1959 |